United States Patent
Park et al.

(10) Patent No.: US 7,316,867 B2
(45) Date of Patent: Jan. 8, 2008

(54) METHOD FOR MANUFACTURING A MULTI-LAYERED THIN FILM FOR USE AS AN ANODE IN A LITHIUM SECONDARY BATTERY

(75) Inventors: Young-sin Park, Kyungki-do (KR); Joo-yeal Oh, Seoul (KR); Hong-koo Baik, Seoul (KR); Sung-man Lee, Kangwon-do (KR)

(73) Assignee: Samsung SDI Co., Ltd., Suwon-Si, Gyeonggi-Do (KR)

( * ) Notice: Subject to any disclaimer, the term of this patent is extended or adjusted under 35 U.S.C. 154(b) by 379 days.

(21) Appl. No.: 10/997,882

(22) Filed: Nov. 29, 2004

(65) Prior Publication Data

US 2005/0074673 A1    Apr. 7, 2005

Related U.S. Application Data

(62) Division of application No. 10/118,030, filed on Apr. 9, 2002, now Pat. No. 6,824,922.

(30) Foreign Application Priority Data

Aug. 25, 2001    (KR) ............................ 2001-0051588

(51) Int. Cl.
*H01M 4/58* (2006.01)
*H01M 4/34* (2006.01)
*H01M 4/54* (2006.01)
*H01M 10/32* (2006.01)
*C23C 14/00* (2006.01)
*C23C 14/32* (2006.01)

(52) U.S. Cl. ............ 429/231.95; 429/219; 204/192.12; 204/192.15; 204/192.17; 204/192.23

(58) Field of Classification Search ........... 429/231.95, 429/219; 204/192.12, 192.15, 192.17, 192.23
See application file for complete search history.

(56) References Cited

U.S. PATENT DOCUMENTS 6,235,427 B1 * 5/2001 Idota et al. .............. 429/218.1
2002/0048705 A1    4/2002 Park et al.

FOREIGN PATENT DOCUMENTS

EP    0 690 517 A1    1/1996

(Continued)

*Primary Examiner*—Gregg Cantelmo
*Assistant Examiner*—Eugenia Wang
(74) *Attorney, Agent, or Firm*—Buchanan Ingersoll & Rooney PC

(57) ABSTRACT

A thin film for an anode of a lithium secondary battery having a current collector and an anode active material layer formed thereon is provided. The anode active material layer is a multi-layered thin film formed by stacking a silver (Ag) layer and a silicon-metal (Si-M) layer having silicon dispersed in a base made from metal reacting with silicon while not reacting with lithium. The cycle characteristic of the thin film for an anode can be improved by suppressing the volumetric expansion and shrinkage of Si occurring during charging/discharging cycles. Thus, a lithium secondary battery with improved life characteristics by employing the thin film for an anode, which greatly improves the chemical, mechanical stability of the interface between an electrode and an electrolyte.

7 Claims, 7 Drawing Sheets

(a)

(b)

(c)

FOREIGN PATENT DOCUMENTS

| | | |
|---|---|---|
| EP | 0 855 752 A2 | 7/1998 |
| EP | 1 028 476 A1 | 8/2000 |
| EP | 1 033 767 A1 | 9/2000 |
| EP | 1 207 566 A2 | 5/2002 |
| WO | 01/52337 A1 | 7/2001 |

* cited by examiner

METHOD FOR MANUFACTURING A MULTI-LAYERED THIN FILM FOR USE AS AN ANODE IN A LITHIUM SECONDARY BATTERY

Priority is claimed to Patent Application No. 2001-51588 filed in Rep. of Korea on Aug. 25, 2001, herein incorporated by reference.

BACKGROUND OF THE INVENTION

1. Field of the Invention

The present invention relates to a thin film for an anode of a lithium secondary battery and a manufacturing method thereof, and more particularly, to a thin film for an anode of a lithium secondary battery having improved charging/discharging cycle characteristics by using a multi-layered thin film as an anode active material layer, the multi-layered thin film formed by stacking a silver (Ag) layer and a silicon-metal (Si-M) layer having silicon dispersed in a base made from metal reacting with silicon while not reacting with lithium.

2. Description of the Related Art

According to recent remarkable growth of microelectronics industry and development of miniaturized, highly efficient electronic devices and miniature sensor devices, there is an increasing demand for sub-miniaturized, ultra-thin film batteries as a power source for driving these devices.

FIG. 1 is a schematic diagram of a conventional thin film battery.

Referring to FIG. 1, a thin film battery is basically constructed such that a cathode 12, an electrolyte 14, an anode 13 and a protective layer 15 are sequentially stacked on a current collector 11 in forms of thin films, and the overall thickness of the layered structure is approximately 10 μm. The thus-constructed conventional thin film battery has the following advantages.

Since the thin film battery is fabricated by depositing a cathode and an anode in the form of thin films, the battery can have a high current density. Also, since the cathode and the anode are formed in the form of thin films, the moving distance among ions is reduced to thus facilitate and promote ionic movement, thereby reducing the amounts of reactants. Since such thin film batteries can be easily manufactured in arbitrary shapes and sizes to be conformable to special purposes, they are very promising as main power sources for miniaturized electronic devices, micro-electro-machanical systems (MEMS) and miniature sensor devices.

In particularly, since a thin film battery is manufactured by the same method as that of a semiconductor device, it can be mounted on a semiconductor chip together with an electronic circuit, thereby implementing a complementary metal oxide semiconductor (CMOS) memory chip using the thin film battery as a back-up power source. Also, an unused area of an electronic device can be minimized, thereby increasing the space utilization efficiency of the electronic device to a maximum. Further, since thin film batteries operating at various voltages and capacities can be realized by serial and parallel connections of unit cells through appropriate designs and etching steps, they can be widely used in a variety of applications.

Studies hitherto made on thin film batteries have concentrated on manufacture and evaluation of cathode thin films made of $V_2O_5$, $LiCoO_2$ or $LiMn_2O_4$, and satisfactory results have been reported. Thin films for an anode for such thin film batteries are typically lithium thin films formed by deposition of a lithium metal.

However, the lithium metal has a low melting point of approximately 180° C. and is melted due to heat generated during soldering in the course of packaging, resulting in damage of a device. Also, since the lithium metal is highly reactive in the air, its managability is poor and a separate device for isolating the lithium metal from moisture and oxygen must be additionally installed. Thus, the use of a lithium metal has various problems to be widely put into practical use as an electrode material for power sources of super miniaturized electronic devices.

In addition to the lithium thin films, attempts at development of thin films for an anode made of silicon tin oxynitride (SITON), tin oxide ($SnO_2$), or nitride, have been made. However, such attempts have not completely been unsuccessful. That is, these thin films for an anode have several problems in controlling irreversible reactions taking place during initial charging/discharging cycles.

In order to overcome the low charging/discharging cycle efficiency of lithium, research into lithium alloys has been carried out. Much attention has been paid to metals capable of forming lithium alloys, such as tin (Sn), silicon (Si) or aluminum (Al), as promising next generation anode active materials. While these anode active materials have good capacity characteristics at low operating voltages in contrast with lithium, a volumetric change in active material, encountered by insertion and release of lithium during charging/discharging cycles, results in a poor thin film structure for an anode and impediment to cycle characteristics, thereby reducing charge/discharge capacity. In particular, in the case of a thin film battery using a solid electrolyte, adhesion at an interface between an electrode and a current collector is considerably reduced, lowering battery performance. Thus, it is a critical issue to develop anode active material having no reduction in capacity due to irreversible reactions during insertion and release of lithium during the first charging/discharging cycle, as anode materials that can replace a lithium metal used in the prior art.

SUMMARY OF THE INVENTION

To solve the above-described problems, it is a first object of the present invention to provide a thin film for an anode of a lithium secondary battery, having improved charging/discharging cycle characteristics and a manufacturing method of the thin film.

To accomplish the above and other objects, a thin film for an anode of a lithium secondary battery according to an embodiment of the present invention includes a current collector and an anode active material layer formed on the current collector, wherein the anode active material layer is a multi-layered thin film formed by stacking a silver (Ag) layer and a silicon-metal (Si-M) layer having silicon dispersed in a base made from metal reacting with silicon while not reacting with lithium.

According to another aspect of the present invention, a method of preparing a thin film for an anode of a lithium secondary battery includes (a) forming a thin film of silicon-metal (Si-M) by depositing a metal reacting with silicon while not reacting with lithium and silicon on a current collector in forms of thin films, (b) forming a thin film of silver (Ag) by depositing Ag on the Si-M layer in form of a thin film, and (c) forming a multi-layered thin film by repeating the steps (a) and (b) one or more times.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
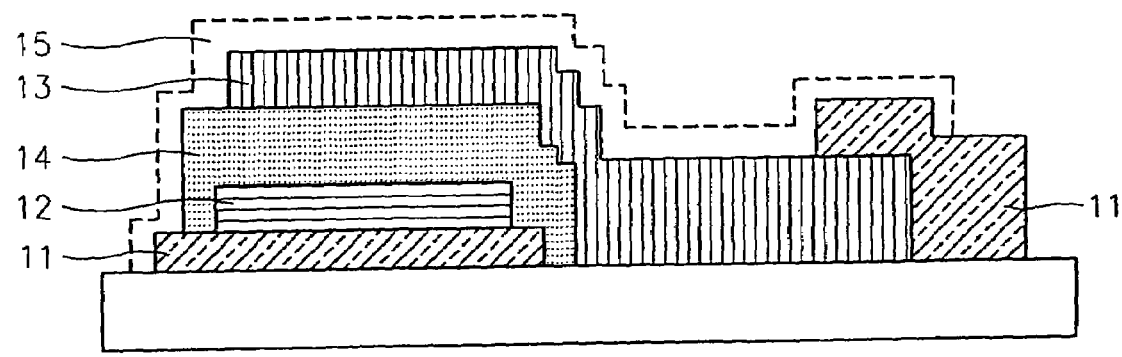
FIG. 1 is a schematic diagram of a conventional thin film battery.

Silicon (Si) exhibits a large capacity relative to lithium (Li) at low operating voltages, and reacts with Li according to the following reaction scheme:

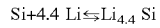

$$Si + 4.4\ Li \leftrightharpoons Li_{4.4}Si$$

Although Si has various advantages including a very high energy density of approximately 400 mAh/g, as charging/discharging cycles proceed, repetition of insertion/release of Li causes repeated expansion and contraction in volume of silicon particles, resulting in cracks. Thus, some silicon particles may not be electrically connected, thereby reducing charging/discharging capacity, making Si difficult to be used as an anode active material. The feature of the present invention lies in that Si and metal (M) are maintained at a bonded state during insertion of Li while suppressing the shortcoming of Si, that is, stress due to volumetric expansion of Si, thereby limiting Li—Si reactions, and the structural stability is increased, thereby improving a cycle characteristic.

The metal in the Si-M layer has excellent ductility and toughness and has a strong chemical affinity to Si to react therewith while not reacting Li. The formation enthalpy between Si and metal added must have a negative value (ΔH(Si-M)<0). Also, the metal must be capable of maintaining a Si-M bond during insertion and release of Li.

Examples of the metal include at least one selected from the group consisting of vanadium (V), manganese (Mn), titanium (Ti), nickel (Ni), platinum (Pt), zirconium (Zr), chromium (Cr), iron (Fe), hafnium (Hf), molybdenum (Mo), niobium (Nb), ruthenium (Ru) and tantalum (Ta).

In particular, vanadium (V) has excellent ductility and toughness and a strong chemical affinity to Si, thereby suppressing Si—Li reactivity during insertion of Li and exhibiting the structural stability during repetition of insertion and release of Li.

In the present invention, silver (Ag) acting as a medium through which Li ions and electrons can move is used to form an anode active material layer, as one of components of a multi-layered thin film for an anode with a Si-M layer. Since Ag does not react with Si, the capacity and reversibility of Li—Si reaction can be secured and the structural stability of an active material can be secured under the conditions of heat treatment that is required for a later packaging process of a thin film battery.

Also, in a lithium secondary battery employing such an anode active material, charging/discharging cycles can vary by controlling micro structures, crystallinity, sizes and distribution features of substances used for the anode active material according to the thicknesses and arrangement order of Si-M and Ag layers, the overall thickness of the anode active material layer, heat treatment conditions of forming a thin film, mixture ratios of Si and M and so on.

The metal (M) content (x) in the Si-M ($Si_{(1-x)}$-$M_x$) layer as the anode active material layer is preferably in the range of 5 to 50 mol %, more preferably in the range of 20 to 30 mol %. If the amount of metal (M) relative to Si exceeds the above range, microparticles of Si as an active material reacting with Li are surrounded by M atoms, that is, Si is shielded by ambient metal, the excess gives rise to the disadvantage that Si atoms cannot react with Li, thereby reducing the electrode capacity as designed. Also, if the amount of metal (M) relative to Si is less than the above range, the shortage entails the disadvantage that Li—Si reactivity is increased, thereby exhibiting unappreciable effect in suppressing a change in the volume of Si particles.

Also, in the multi-layered thin film for an anode of the present invention, the topmost layer thereof is preferably made from Ag, which is because a good cycle characteristic of a lithium secondary battery employing the thin film for an anode can be achieved through such arrangement.

Now, a thin film for an anode according to an embodiment of the present invention will be described in more detail with reference to FIGS. 2A through 2C.

As shown in FIGS. 2A through 2C, the thin film for an anode according to the present invention includes a current collector and a multi-layered thin film consisting of an Si-M layer as an anode active material layer and a silver (Ag) layer stacked on the current collector.

In the thin film for an anode according to the present invention, the anode current collector generally includes, but is not limited to, a copper (Cu) layer, and the thickness thereof is generally in the range of 100~300 nm.

The anode active material layer shown in FIG. 2A includes sequentially stacked Si-M/Ag layers. The anode active material layer shown in FIG. 2B includes sequentially stacked Si-M/Ag/Si-M/Ag layers. The anode active material layer shown in FIG. 2C includes sequentially stacked Si-M/Ag/Si-M/Ag/Si-M/Ag layers.

As shown in FIGS. 2A through 2C, the anode active material layer according to the present invention is a preferably structure in which the Si-M layer and the Ag layer are alternately stacked, more preferably a structure in which an Ag layer is interposed between Si-M layers, in view of the effect of suppressing an increase in the volume of the anode active material layer. Here, since Ag acts as a medium through which Li ions and electrons can move and does not react with Si, the capacity and reversibility of Li—Si reaction can be secured and the structural stability of an active material can be secured under the conditions of heat treatment that is required for a later packaging process of a thin film battery.

The thickness of a Si-M layer and number of stacked layers, which are in proportion to the amount of an anode active material, can vary according to the requirements of a device and the capacity of a cathode. However, the preferred thickness of an Si-M layer is in the range of 50 to 450 Å. If the thickness of an Si-M layer is less than 50 Å, it is necessary to increase the number of stacked layers of Si-M/Ag to meet the requirement as designed. If the number of Ag layers exceeds a predetermined range, the overpotential of a thin film for an anode may undesirably increase. If thickness of an Si-M layer is greater than 450 Å, the metal added cannot sufficiently suppress an increase in the volume of Si.

Also, Ag tends to react with Li at low voltages of 0.08 V or less to form a stable Li—Ag alloy. However, during charge, an Li—Ag alloy is slowly decomposed to Li and Ag so that the Li cannot completely escape from the Li-Ag alloy, from which low reversibility is resulted, acting as irreversible capacity.

To this end, Ag is deposited to a minimum thickness, preferably in the range of 10~70 Å. If the thickness of an Ag layer is less than 10 Å, the effect of suppressing a change in the volume of an Si layer is unappreciable. If the thickness is greater than 70 Å, the Li—Ag alloy is slowly decomposed to Li and Ag, which is disadvantageous.

The multi-layered thin film consisting of Si-M layer/Ag layer stacked on a current collector according to the present invention makes it possible to achieve a lithium secondary battery having various performance characteristics according to the stacked order and thickness thereof.

The Si-M layer is formed by dispersing Si on a base formed from metal which does not react with Li but reacts with Si through a thin film deposition process. Methods of forming the Si-M layer include, but are not limited to, co-sputtering, e-beam evaporation, ion-beam assisted deposition and chemical vapor deposition. Here, the processing conditions of each method are not specially restricted, and explanations thereof will now be given briefly.

According to the co-sputtering, various components are finely and uniformly distributed and an amorphous or nano-crystalline thin film can be attained according to the cooling extent of a substrate. Also, a multi-component thin film can be manufactured by co-deposition including mosaic sputtering using a mosaic target, co-sputtering using two or more targets, or sputtering using an alloy target.

In the case of deposition by co-sputtering separate targets, thin films having various compositions can be obtained by adjusting the radio frequency (rf) power applied to the respective targets.

In the case of co-sputtering, the only parameter for adjustment of the composition of a thin film is the rf power applied to the respective targets because other deposition factors, including deposition pressure, gas flow rate, mixture ratio of gas and the like, are under the same conditions. Generally, while the deposition power of a basic material, i.e., Si, is maintained at a predetermined value, the deposition powers of materials added are varied. For example, the deposition power for Si is in the range of 100 to 300 W, and the deposition power for metal (M) is in the range of 0 to 100 W.

In the case of mosaic target based sputtering, the number of chips is a parameter for a compositional change, with other sputtering conditions maintained to be the same. In the case of co-sputtering of Si and metal selected from V, Mn, Ti, Ni, Pt, Zr, Cr, Fe, Hf, Mo, Nb, Ru and Ta, a thin film of Si having a size of several tens of nanometers dispersed into the metal base is attained. As described above, when the Si-M layer is formed by co-sputtering, characteristics of a finally obtained anode active material slightly vary according to distribution phase, particle size or mixture ratio of the metal dispersed in Si. A good cycle characteristic of the metal can be achieved by controlling the metal to be uniformly distributed in forms of microparticles in Si.

According to the e-beam evaporation, e-beams are simultaneously focused onto different deposition sources for evaporation and co-sputtered on a substrate. At the same time, argon ions may be accelerated to then be irradiated onto the substrate, thereby increasing the mobility of deposited atoms and changing the surface state of a thin film. The composition of the thin film can be changed by adjusting the flux (e-beam current) of e-beams applied to the respective deposition sources. Also, the crystallinity and microstructure of the thin film can be adjusted by changing acceleration voltages.

Deposition using ion-beam assisted deposition increases the mobility and reactivity of atoms as accelerated e-beams collide with atoms deposited on a substrate, thereby appropriately adjusting the conditions of ion-beams. In such a manner, amorphous, crystalline multi-component thin films can be manufactured. The composition of the thin film can be changed by adjusting ion-beam current of the ion-beams applied to the respective deposition sources. Also, the crystallinity and microstructure of the thin film can be adjusted by changing the Ar ion flux and acceleration voltages.

Figure 2:
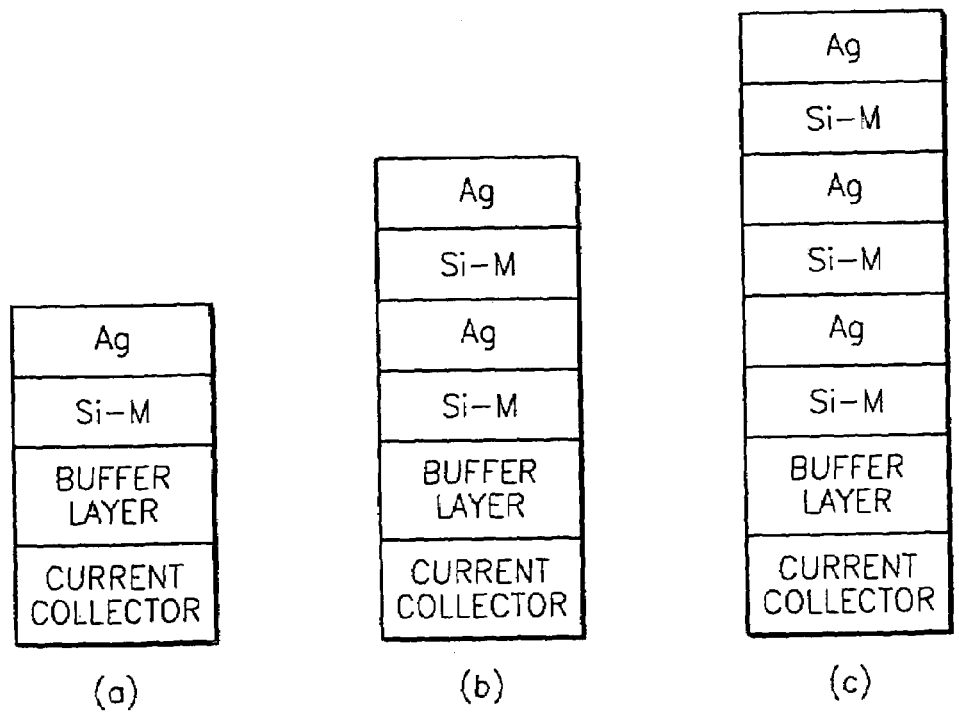
FIGS. 2A through 2C schematically illustrate the structures of anodes employing multi-layered films prepared by examples of the present invention.

In the thin film for an anode according to the present invention, as shown in FIGS. 2 through 2C, a buffering layer is preferably formed between a current collector and an anode active material layer. The buffering layer is formed of at least one metal selected from the group consisting of V, Ni, Mo and Cu, and serves to relieve the stress between the anode active material layer and the current collector and to secure the stability at the interface therebetween. Here, the thickness of the buffering layer is preferably in the range of 50 to 250 Å. If the thickness of the buffering layer is less than 50 Å, the buffering layer cannot sufficiently perform a buffering action to relieve the stress the anode active material layer and the current collector. If the thickness of the buffering layer is greater than 250 Å, the excess gives rise to an increase in the overall volume of the thin film for an anode without a considerable change in the electrochemical property, which is disadvantageous.

The present invention will now be described with reference to the following examples, but it should be understood that the present invention is not limited thereto.

EXAMPLE 1

Various components of a thin film, that is, Si, V and Ag targets each having a diameter of 2 inches, were sequentially deposited on a copper (Cu) substrate to prepare a Cu/V (200 Å)/Si-V (300 Å)/Ag (50 Å) thin film for an anode.

During sputtering, the initial degree of vacuum was first adjusted to $2 \times 10^{-6}$ torr or less, a vanadium (V) layer was then deposited to a thickness of 200 Å at rf power of 50 W under the condition of Ar gas induced at 5 mTorr operating pressure and 10 sccm flow rate, and Si and V were co-sputtered on the resultant product to a thickness of 300 Å to prepare a single-layered Si—V film (sometimes also called a "layer" throughout the specification). Ag was then deposited on the Si—V film to a thickness of 50 Å.

In order to adjust the contents of Si and V in the single-layered Si—V film, the rf power applied to the V target in the range of 0 to 100 W was varied, while fixing the rf power applied to the Si target to 200 W, thereby manufacturing thin films for an anode having various compositions. For comparison of characteristics of the thin films for an anode, the thickness of the single-layered $Si_{(1-x)}$—$V_x$ film was fixed to 300 Å. In order to evaluate the electrochemical properties of the thus-manufactured thin films for an anode, a lithium secondary batteries were manufactured using Li metals as a counter electrode and a reference electrode and an electrolytic solution of 1M $LiPF_6$ dissolved in a mixed solvent of ethylene carbonate (EC) and diethyl carbonate (DEC).

COMPARATIVE EXAMPLE 1

A lithium secondary battery was manufactured by the same method as in Example 1, except that a Cu/V(200 Å)/Si(300 Å) thin film for an anode was manufactured by depositing only a 2-inch diameter Si target on a Cu current collector.

Figure 3:
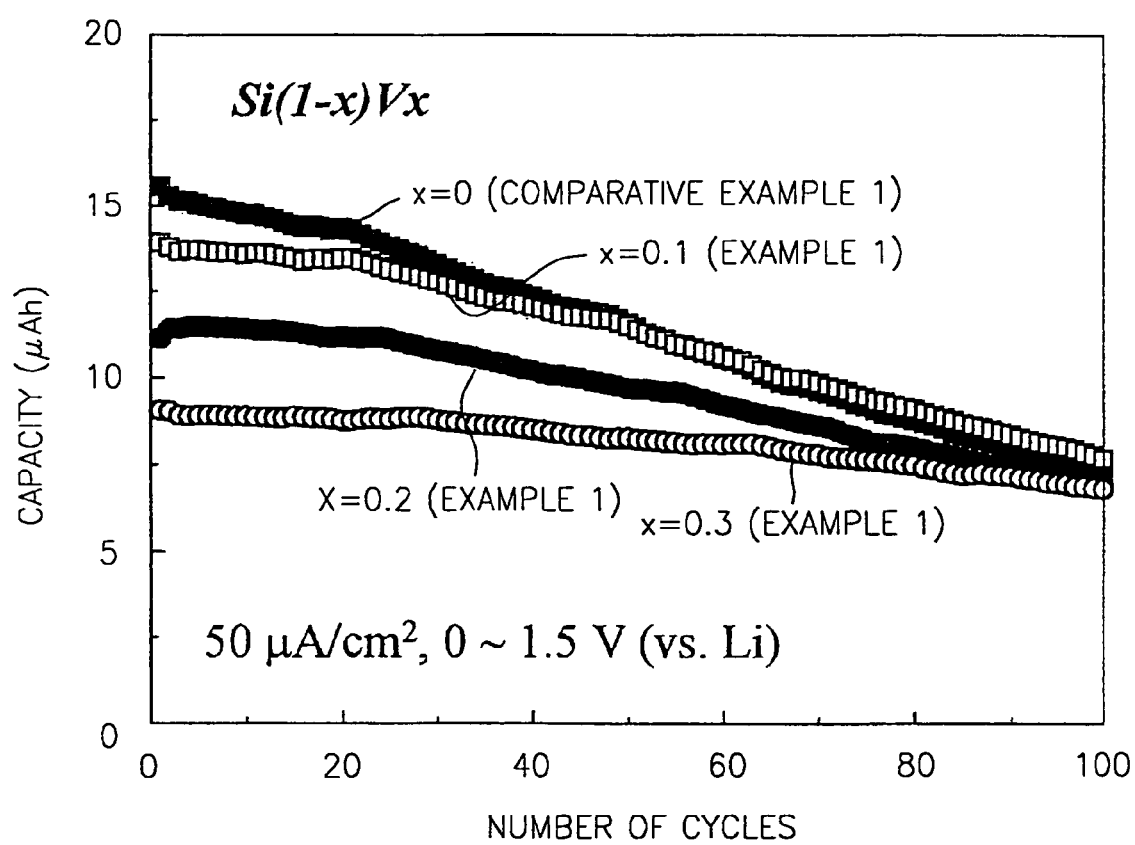
FIG. 3 represents charging/discharging cycle characteristics of thin films for an anode prepared by Example 1 of the present invention and Comparative Example 1.

Vanadium (V) dependent cycle characteristics of the lithium secondary batteries employing the thin films for an anode prepared by Example 1 and Comparative Example 1 were evaluated, and the evaluation results are shown in FIG. 3.

Evaluation of cycle characteristics was made by repeating at least 100 cycles of charging and discharging at a constant current density of 50 µA/cm² within the potential range of 0 to 1.5V versus Li. Referring to FIG. 3, as the amount (x) of V added increased, the capacity of a battery decreased. This is because microparticles of Si are surrounded by V particles, so that Li—Si reactions are suppressed. In this case, if the amount of V added is smaller than 0.2 (molar ratio), the stress was not fully released due to volumetric expansion and shrinkage during the Li—Si reactions, as shown in FIG. 3. When the amount of V added was greater than or equal to 20 mol %, cycle characteristics of the lithium secondary battery employing the thin film for an anode according to this example were greatly improved, compared to the case of employing a single layer of Si only (i.e., x=0). In particular, when the amount of V added was 30 mol %, the thin film for an anode was not lower than 95% in initial capacity maintenance ratio even after 100 cycles. As described above, compared to the case of employing the Si single layer, deterioration of an anode active material due to volumetric expansion and shrinkage of Si was considerably reduced such that V microparticles were distributed to surround Si particles by a co-sputtering method, thereby greatly improving cycle characteristics.

Figure 4:
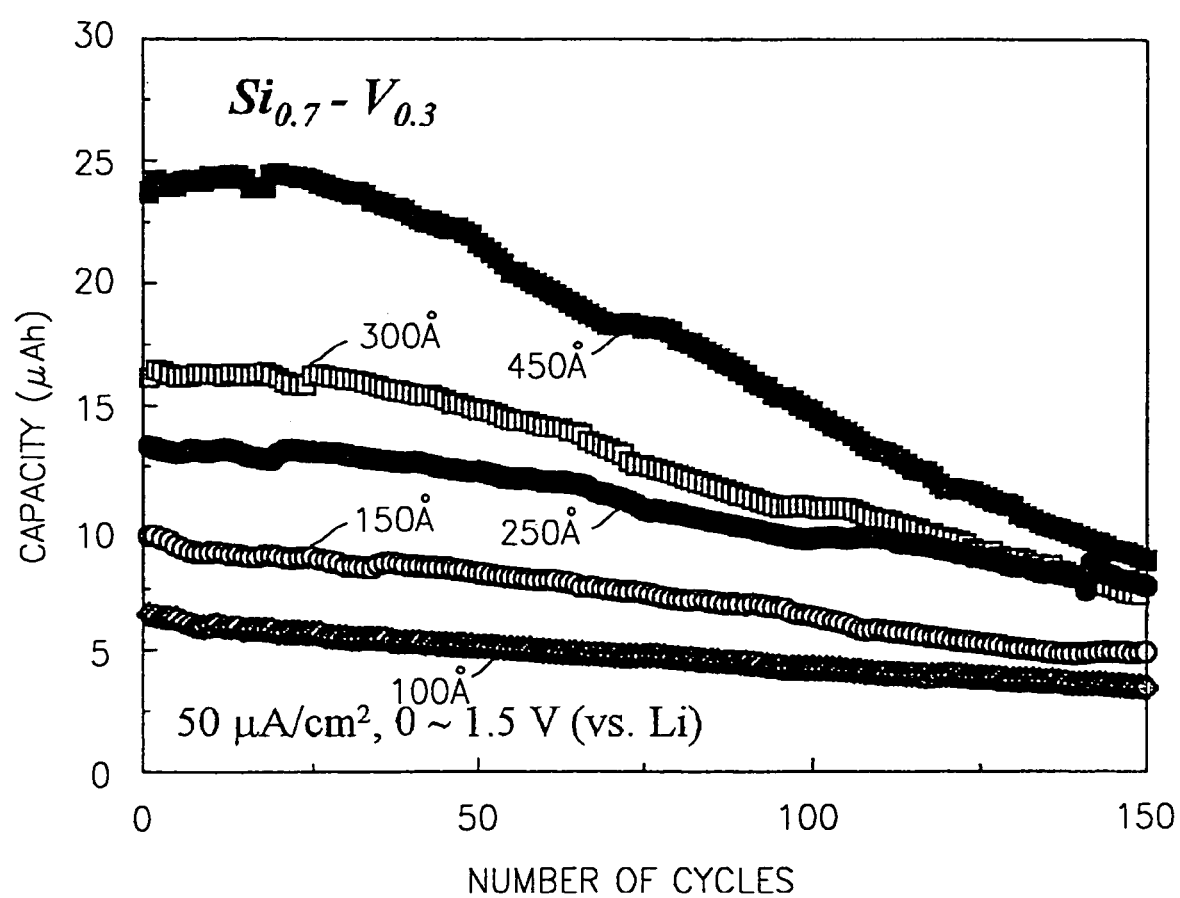
FIG. 4 represents charging/discharging cycle characteristics of a single-layered film having a composition of $Si_{0.7}V_{0.3}$, prepared by Example 1 of the present invention.

Cycle characteristics of a multi-layered thin film for an anode having a composition of $Si_{0.7}V_{0.3}$/Ag (50 Å) depending on the thickness of a $Si_{0.7}V_{0.3}$ layer were evaluated, and the evaluation results are shown in FIG. 4. Si and V were co-sputtered with rf powers of 200 W and 50 W, respectively, to manufacture a 100 to 450 Å thick thin film for an anode having the above composition.

Evaluation of cycle characteristics was made by repeating at least 150 cycles of charging and discharging at a constant current density of 50 µA/cm² within the potential range of 0 to 1.5 V. Referring to FIG. 4, as the thickness of the single-layered Si—V film having the above composition increased, the charge/discharge cycle efficiency was lowered. In particular, if the thickness of the single-layered Si—V film was greater than or equal to 450 Å, the capacity was sharply decreased according to an increase in the number of cycles.

This is because according to an increase in the thickness of the single-layered Si—V film to facilitate the overall Li—Si reactions, V atoms added cannot fully release the stress due to volumetric expansion and shrinkage of Si.

If the thickness of the single-layered Si—V film was less than 450 Å, cycle characteristics of the thin film for an anode were improved. In particular, when the single-layered Si—V film was in the thickness range of 100-250 Å, the thin film was not lower than 90% in the initial capacity maintenance ratio even after 150 cycles.

Figure 5:
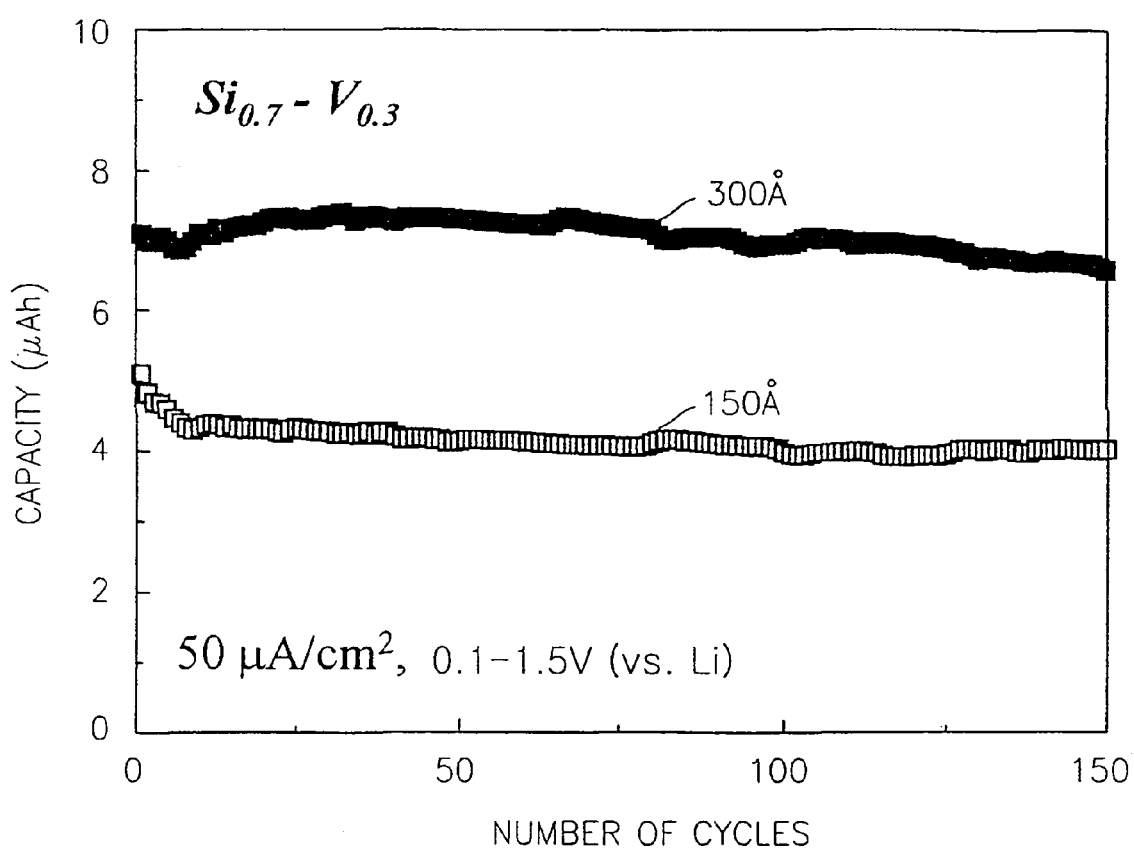
FIG. 5 represents charging/discharging cycle characteristics of the single-layered film having a composition of $Si_{0.7}V_{0.3}$, prepared by Example 1 of the present invention, in the cases where the single-layered films have thicknesses of 150 Å and 300 Å under a lower cut-off discharge voltage of 0.1 V versus lithium.

When the thicknesses of the single-layered film having the composition of $Si_{0.7}V_{0.3}$ were 150 Å and 300 Å, respectively, evaluation of cycle characteristics was also made at a lower cut-off voltage of 0.1 V versus Li, and the evaluation results are shown in FIG. 5. Referring to FIG. 5, when the Li-Si reactions were suppressed by setting the lower cut-off discharge voltage to 0.1 V, the capacity was slightly reduced. However, compared to the case shown in FIG. 4, in which the cut-off voltage was set to 0 V, cycle characteristics were greatly improved. Thus, it was confirmed that cycle characteristics of the single-layered film could be considerably improved by adjusting the lower cut-off discharge voltage.

EXAMPLES 2-4

Thin films for an anode were manufactured in the same manner as in Example 1, except that each $Si_{0.7}M_{0.3}$ layer (300 Å) was formed using Mn, Ti and Zr as metals (M) in an Si-M layer as anode active material layers, instead of V, respectively.

Figure 6:
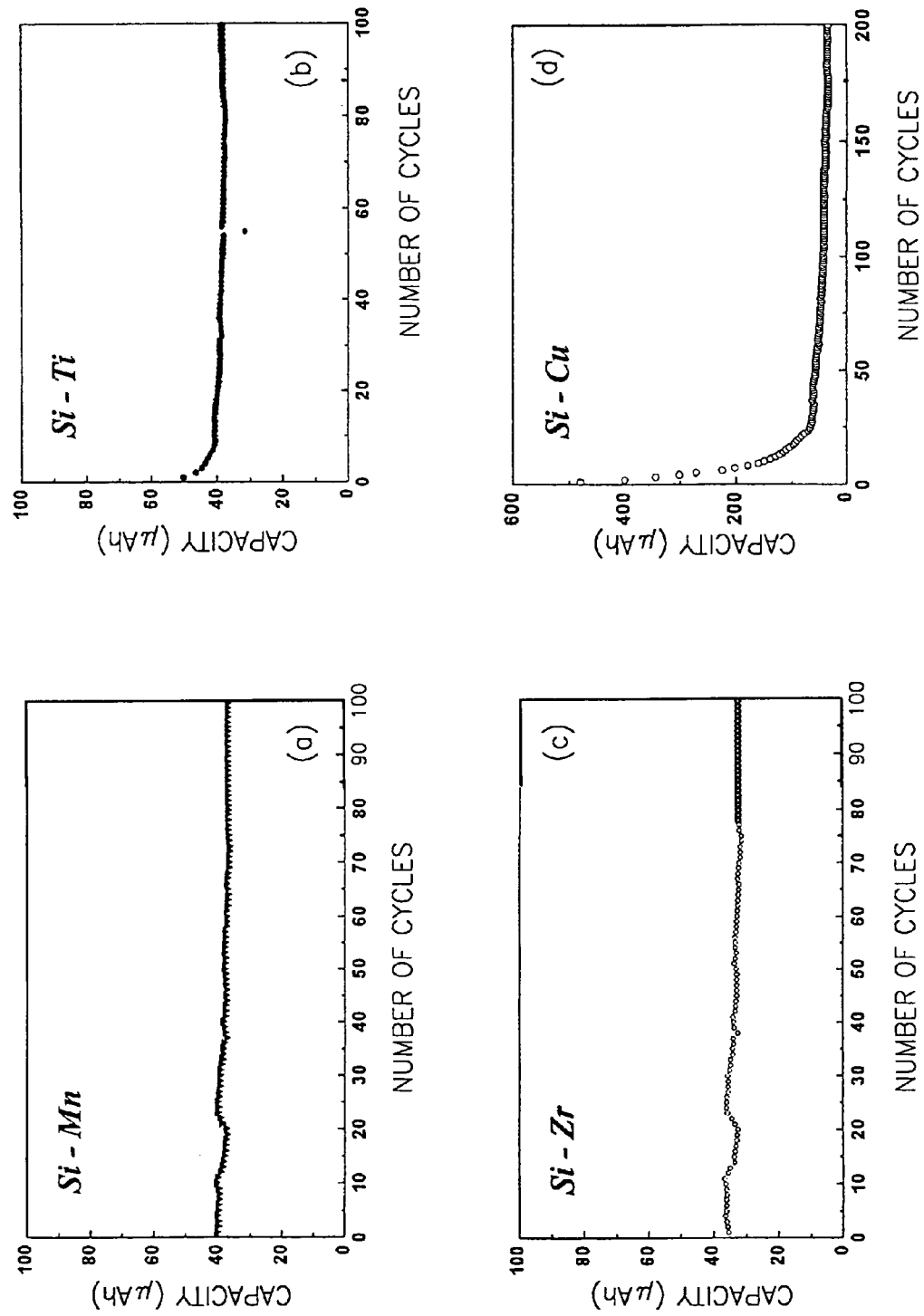
FIGS. 6A through 6C represent cycle characteristics of anodes employing single-layered Si—Mn, Si—Ti and Si—Zr films prepared by Examples 2-4 of the present invention, respectively.
FIG. 6D represents cycle characteristics of an anode employing a single-layered Si—Cu film prepared by Comparative Example 2.

Lithium secondary batteries employing the single-layered films as anodes were manufactured, and FIGS. 6A through 6C show cycle characteristics thereof. Evaluation of cycle characteristics of these thin films for an anode was made by repeating at least 50 cycles of charging and discharging. Referring to FIGS. 6A through 6C, in the case of single-layered films with Mn, Ti and Zr added, like in the case of the single-layered Si—V film, deterioration of anode active materials due to volumetric expansion and shrinkage of Si was considerably reduced, thereby greatly improving cycle characteristics compared to the case of Comparative Example 1. The initial discharge capacity of each single-layered film was maintained without a considerable reduction even after 90 cycles. This is because the metals added are strongly bonded to Si while being retained at amorphous structures during insertion and release of Li.

COMPARATIVE EXAMPLE 2

A single-layered Si—Cu film was manufactured in the same manner as in Example 2 and cycle characteristics thereof were evaluated. The evaluation results are shown in FIG. 6D. Evaluation of cycle characteristics was made by repeating at least 200 cycles of charging and discharging at a constant current density of 50 µA/cm² within the potential range of 0 to 1.5 V. All metals added in Examples 2-4 have strong chemical affinity to Si and are capable of maintaining Si-M bonds during insertion and release of Li. As shown in FIG. 6D, in the case where the metal added was Cu, the capacity was considerably reduced within the period of approximately 20 cycles. Such a considerable reduction in the capacity is because Cu is not so strongly bonded to Si, compared to the above-referenced metals, resulting in cutting of a Si—Cu bond due to insertion of Li into the Si—Cu bond.

EXAMPLE 5

Various components of a thin film for an anode, that is, Si, V and Ag targets each having a diameter of 2 inches, were sequentially deposited on a Cu substrate to prepare thin films for an anode having the structures shown in Table 1. During sputtering, the initial degree of vacuum was first adjusted to $2 \times 10^{-6}$ torr or less, a vanadium (V) layer was then deposited to a thickness of 200 Å at rf power of 50 W under the condition of Ar gas induced at 5 mTorr operating pressure and 10 sccm flow rate, and an Ag layer and an Si—V layer alternately deposited on the resultant product. The Ag layer was deposited between Si—V layers to a thickness of 50 Å at a dc voltage of 270 V with a current of 30 mA, and the Si—V layer having the same composition as in Example 1, that is, the $Si_{0.7}V_{0.3}$ layer, was deposited to a thickness of 150 Å

TABLE 1

| Sample | Layered structure of anode active material |
| --- | --- |
| MSB-1 | Cu/V (200 Å)/(Si-V)/Ag |
| MSB-2 | Cu/V (200 Å)/(Si-V)/Ag/(Si-V)/Ag |
| MSB-3 | Cu/V (200 Å)/(Si-V)/Ag/(Si-V)/Ag/(Si-V)/Ag |

Figure 7:
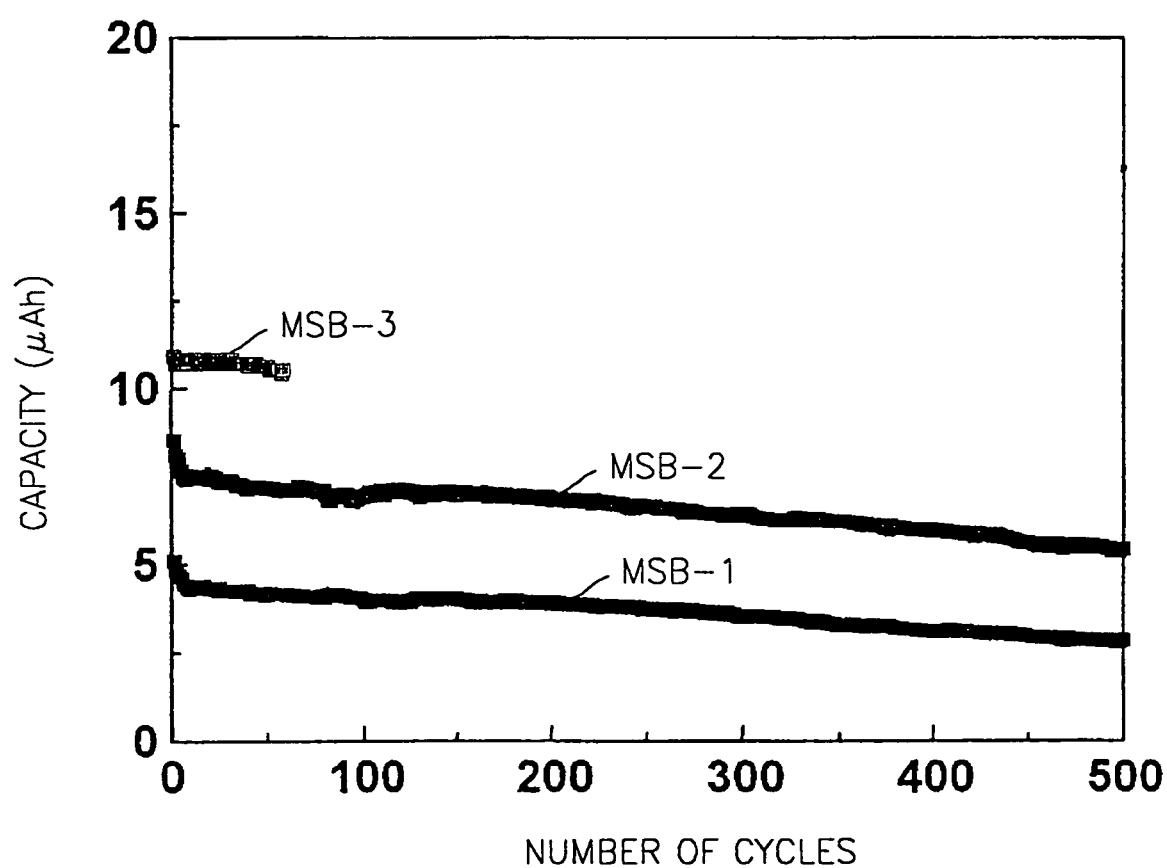
FIG. 7 represents cycle characteristics of multi-layered thin films prepared by Example 5 of the present invention.

Cycle characteristics of the multi-layered films are shown in FIG. 7. Here, the cycle characteristics were evaluated by repeating at least 200 cycles of charging and discharging at a constant current density of 50 μA/cm$^2$ within the potential range of 0 to 1.5 V. The capacities of the multi-layered films increased in proportion to the number of Si—V layers. In cases of layered structures of a Si—V layer and two Si—V layers, a slight decrease in the capacity was observed within an initial period of several cycles, and 90% or higher of the initial capacity was maintained even after 200 cycles.

Referring back to FIG. 4 for Example 1, as the thickness of the Si—V layer increases, the overall Li—Si reactions increase so that V atoms added cannot fully release the stress due to volumetric expansion and shrinkage of Si, resulting in deterioration of cycle characteristics.

However, as shown in FIG. 7 for Example 5, the Ag layer is interposed between the Si—V layers, thereby increasing the capacity without deterioration in cycle characteristics even when the overall thickness of the Si—V layers is increased up to 450 Å.

As described above, the use of a multi-layered Si—V/Ag film as an anode active material layer makes it possible to design a thin film for an anode having a capacity larger than in the case of using a single-layered Si—V film.

EXAMPLE 6

A lithium secondary thin film battery was manufactured using a single-layered Si—V film as follows. First, a platinum (Pt) film as a cathode collector was deposited on an alumina ($Al_2O_3$) substrate to a thickness of 3000 Å at rf power of 50 W under the condition of Ar gas induced at 5 mTorr operating pressure and 10 sccm flow rate, and then $LiCoO_2$ as a cathode material was deposited thereon to a thickness of 7000 Å at rf power of 150 W in a mixed gas atmosphere of argon and oxygen (8:2 in sccm) induced at 5 mTorr operating pressure and 10 sccm flow rate. After deposition, heat treatment was performed at approximately 800° C. in an oxygen atmosphere for 1 hour for crystallization of a $LiCoO_2$ film. Thereafter, a 1.2 μm thick Lipon thin film was deposited using a $Li_3PO_4$ target as a solid electrolyte at rf power of 60 W, and then the single-layered Si—V anode film of the present invention was deposited on the resultant product to a thickness of 300 Å, thereby manufacturing a thin film battery.

Figure 8:
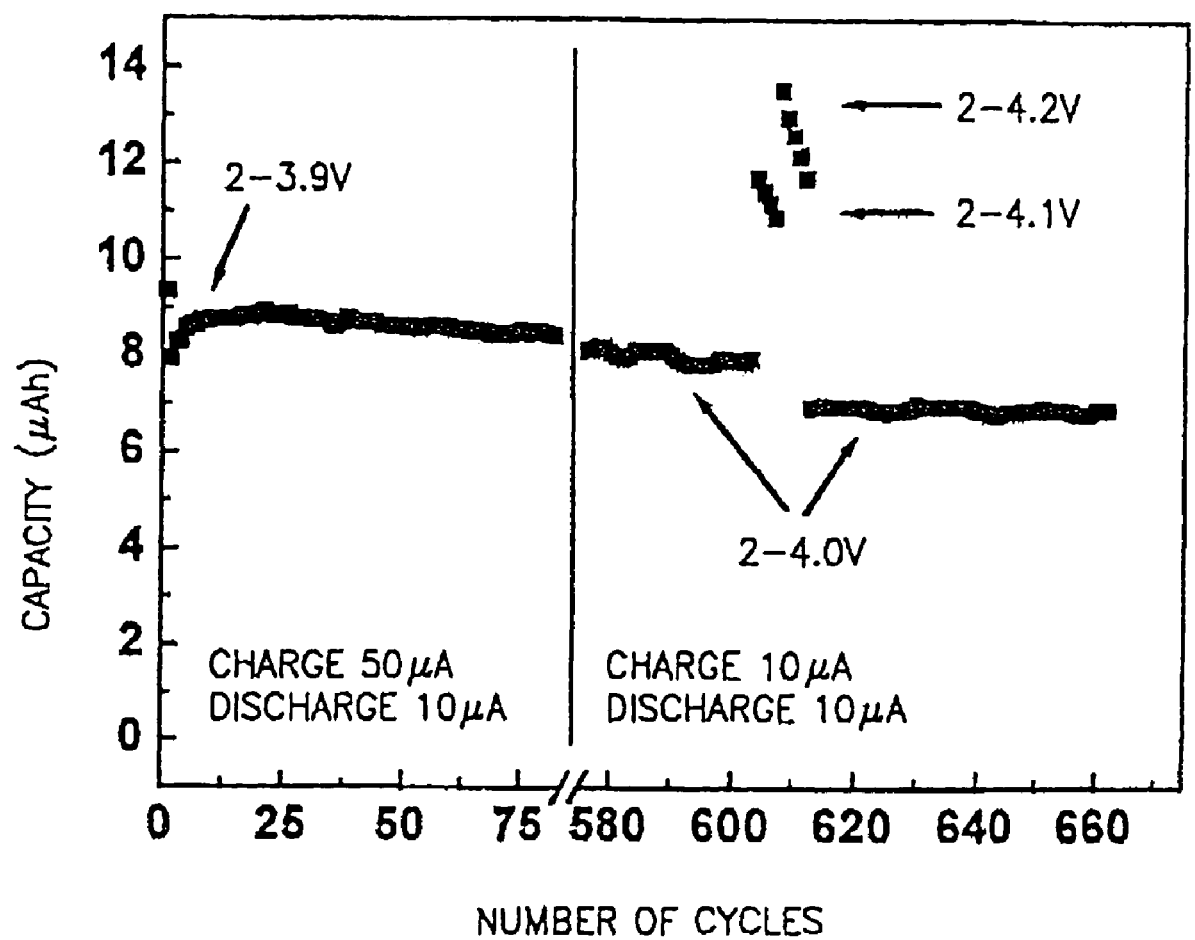
FIG. 8 is a graph showing cycle characteristics of a thin film battery prepared by Example 6 of the present invention.

Cycle characteristics of the thus-manufactured thin film battery were evaluated within the potential range of 2 to 4.2 V with charge and discharge currents varied, and the evaluation results are shown in FIG. 8. As shown in FIG. 8, the thin film battery exhibits very stable cycle characteristics.

When the thin film battery was subjected to a cycling test in the potential range of 2 to 3.9 V, the initial capacity 9.4 μAh was sharply decreased to 8.0 μAh during the second cycle. The battery capacity was gradually increased up to 9.0 μAh until 20 cycles were repeated, and then a good cycle characteristic was exhibited afterwards without a considerable reduction in the capacity. After approximately 600 cycles, the upper cut-off charge voltages were increased to 4.1 V and 4.2 V and the thin film battery was subjected to a cycling test. The result showed that the battery capacity increased but sharply decreased subsequently within the period of several cycles. As confirmed in FIGS. 4 and 5 for Example 1, if the cycle the lower cut-off discharge voltage of the thin film for an anode according to the present invention is reduced to 0 V, the cycle characteristic is deteriorated. However, as shown in FIG. 5, when the lower cut-off discharge voltage is 0.1 V, a very stable cycle characteristic is exhibited. That is to say, if the upper cut-off charge voltages are increased to 4.1 V and 4.2 V, the discharge voltage of an Si—V thin film for an anode is lowered, thereby resulting in deterioration in cycle characteristic. If the charge voltage of the thin film battery is varied to 4.0 V after several cycles, a good cycle characteristic is maintained while exhibiting a reduction in the capacity. With upper cut-off voltages varied to 3.9 V and 4.2 V, a cycle characteristic was evaluated. The evaluation result showed that the average voltage of the thin film battery was in the range of 3.2 to 3.5 V and a very good cycle characteristic was exhibited when the battery was charged up to 4.0 V.

The cycle characteristic of the thin film for an anode according to the present invention can be remarkably improved by suppressing volumetric expansion and shrinkage of Si during charging/discharging cycles. Therefore, use of the thin film for an anode according to the present invention can greatly improve the chemical, mechanical stability of the interface between an electrode and an electrolyte, thereby preparing a lithium secondary battery having improved life characteristics.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for manufacturing a multi-layered thin film structure for use as an anode of a lithium secondary battery comprising:

(a) forming a thin film of silicon-metal (Si-M) by depositing a metal reacting with silicon and silicon on a current collector to form a thin film having a layer thickness of 50 to 450 Å while not reacting with lithium;

(b) forming a thin film of silver (Ag) by depositing Ag on the Si-M layer in form of a thin film silver layer having a thickness of 10 to 70 Å; and (c) forming a multi-layered stacked thin film structure on the current collector by repeating the steps (a) and (b) more than one time.

2. The method according to claim 1, wherein the metal (M) is at least one selected from the group consisting of vanadium (V), manganese (Mn), titanium (Ti), nickel (Ni), platinum (Pt), zirconium (Zr); chromium (Cr), iron (Fe); hafnium (Hf); molybdenum (Mo), Niobium (Nb); ruthenium (Ru) and tantalum (Ta).

3. The method according to claim 1, wherein the metal (M) content in the Si-M layer as an anode active material layer is in the range of 5 to 50 mol %.

4. The method according to claim 1, wherein the deposition in steps (a) and (b) to form thin film layers are each performed by a method selected from co-sputtering, e-beam evaporation and ion-beam assisted deposition.

5. The method according to claim 1, wherein the metal (M) content in the Si-M layer as an anode active material layer is in the range of 20 to 30 mol %.

6. The method according to claim 1, wherein the current collector is a copper layer.

7. The method according to claim 6, wherein said copper layer has a thickness in the range 100 to 300 nm.

* * * * *